Patented Sept. 16, 1924.

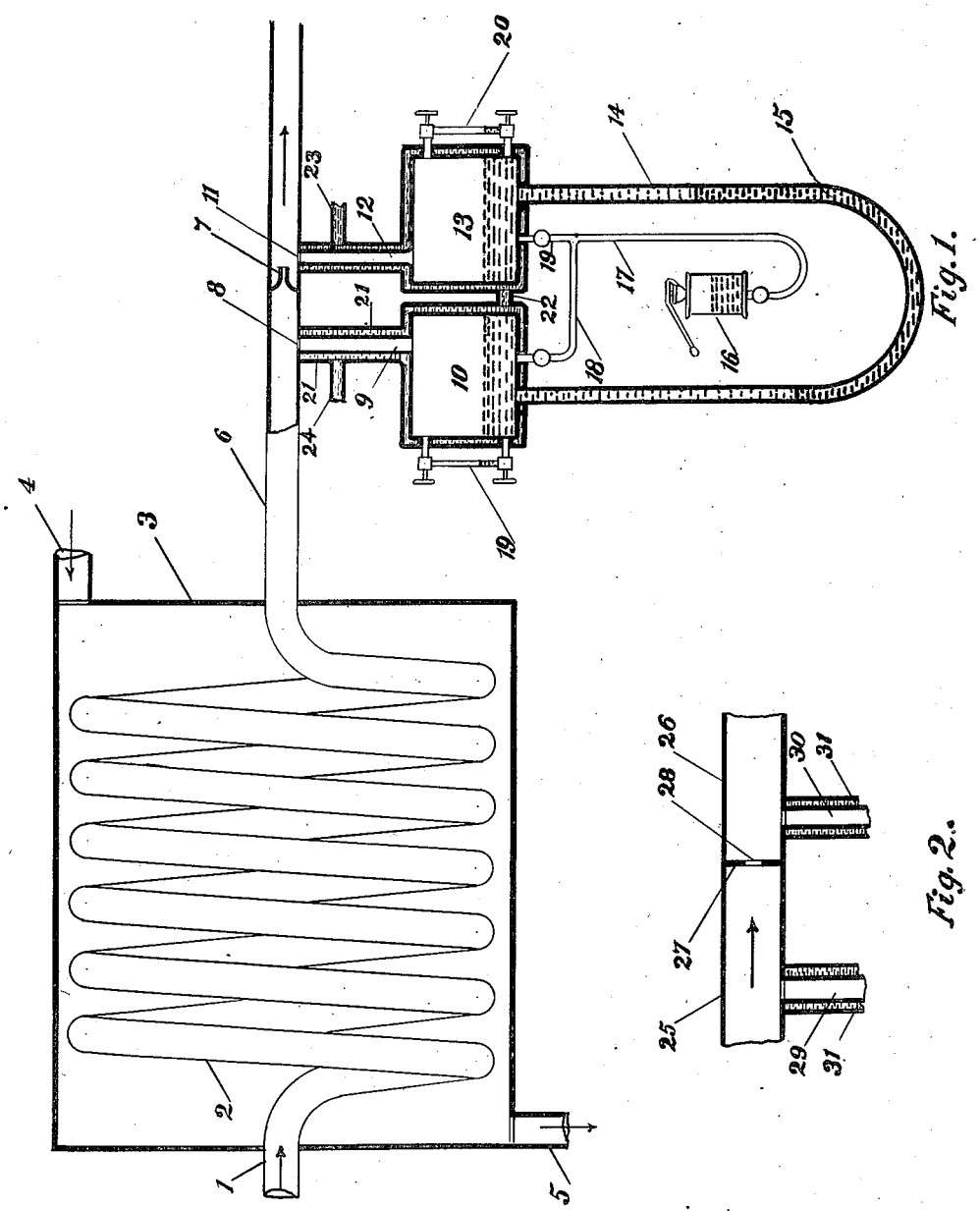

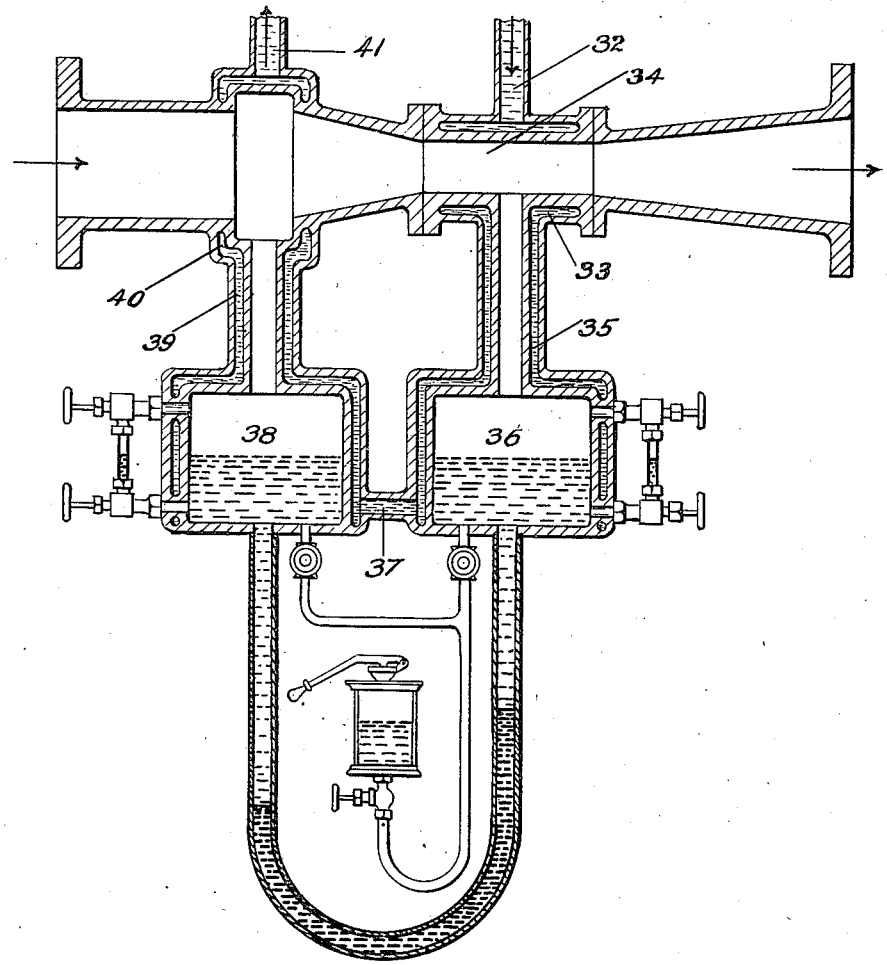
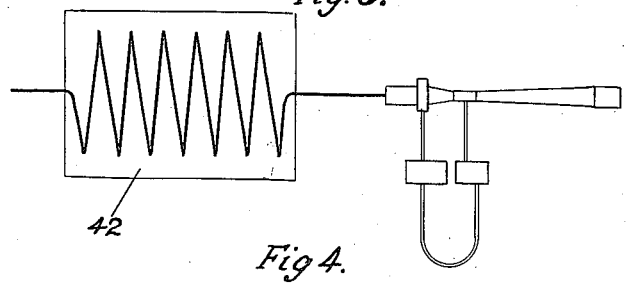
Fig. 3.
Fig. 4.

1,508,519

UNITED STATES PATENT OFFICE.

GEORGE A. HORNE, OF PLAINFIELD, NEW JERSEY.

HEAD METER.

Application filed December 29, 1923. Serial No. 683,527.

*To all whom it may concern:*

Be it known that I, GEORGE A. HORNE, a citizen of the United States, residing at Plainfield, county of Union, and State of New Jersey, have invented certain new and useful Improvements in Head Meters, of which the following is a specification.

This invention relates more especially to head meters for continuously measuring volatile fluids circulating in refrigerating cycles such as shown and described in U. S. Patent No. 1,471,732, granted to me on October 23rd, 1923. In meters of this character, certain residual bodies of the supercooled refrigerant are contained in and around the meter with the result that under some temperature conditions, vaporization takes place and seriously interferes with the metering operation.

The primary object of my invention is to provide an improved construction, combination and arrangement of parts whereby this objection may be overcome in volatile fluid meters of the nozzle, orifice, venturi, or similar types of head meters. Certain specific objects of invention will appear in the specification and be pointed out in the appended claims, reference being had to the accompanying drawings which exemplify my invention in connection with certain forms of head meters. The term "head meters" as used in the present specification and claims is adopted from the First Report of the American Society of Mechanical Engineers Research Committee on Fluid Meters which reads as follows: "'Head' meters are those in which the stream of fluid creates a difference of pressure, or a differential head through the primary device, this head depending upon the speed and density of the fluid."

In the drawings:

Figure 1 is a diagrammatic vertical section of one embodiment of my improved metering apparatus, parts being broken away, and parts shown in elevation;

Figure 2 is a fragmentary detail showing a modified form of the continuous flow meter;

Figure 3 is an enlarged vertical section of a venturi meter with manometer attached and constructed in accordance with the principles of my invention; and Figure 4 is a diagrammatic view showing the connections between the venturi meter shown in Figure 3 and related parts.

The measurement of a liquid refrigerant moving continuously thru a refrigerating cycle, serves two purposes. First, it provides a ready means for calculating the refrigerating output of the system. Second, it provides a ready and accurate means for controlling the refrigerating process. As is well known, when a fluid is passed thru a head meter of the nozzle, orifice, venturi or similar type, the velocity at the restricted point is increased while the total pressure is decreased. Whenever such a fluid is free from gas, such a meter is capable of accurately determining the amount of such fluid passing therethru during a given period of time. On the other hand should a volatile refrigerating liquid having a temperature at or near its critical temperature of boiling, be passed therethru, an accurate determination of the quantity is rendered impossible by the presence of gas in the fluid passing thru the meter. Thus the total differential pressure between the restricted area and the full cross-sectional area of the meter, serves to indicate the necessary amount of supercooling which must be imparted to a volatile fluid such as that used in refrigerating processes before said fluid enters the meter in order to prevent the formation of gas therein during the metering operation.

Referring more particularly to the drawings and to the embodiments shown therein, in Figure 1, the volatile fluid which for example, has been derived from the preceding steps of compressing and condensing the gaseous refrigerant as described in my above identified patent, is conveyed by a pipe 1 to a coil 2 which is disposed within a supercooling chamber 3. A suitable cooling medium, such for example as water may be introduced thru an inlet 4 and discharged thru an outlet 5, the effect upon the condensed refrigerant within the coil 2 being to reduce the temperature thereof to a point below the critical temperature of boiling corresponding to the lowest pressure to which said refrigerant is subjected within the metering tube. Leading from the coil 2 is a pipe 6 within which is located a nozzle 7 which produces a relatively high pressure at the upper end 8 of a tube 9 which opens at its lower end into an equalizing chamber 10. At the same time a relatively low pressure is produced at the upper end 11 of a tube 12 which opens into the right hand equalizing chamber 13. Said equalizing chambers are connected by a U-shaped manometer tube 14 within which is placed a body of mercury 15. Above the mercury in either arm of said tube is a body of oil being employed to partly fill the equalizing chambers 10 and 13. In order to maintain the oil columns on a common lever in both of said chambers, an oil pump 16 may be provided with a tube 17 which divides at its upper end into branches 18 and 19 leading respectively to the equalizing chambers 10 and 13. As indicated in Fig. 1, the upper surfaces of the oil in equalizing chambers 10 and 13, are maintained on a common level, said chambers being provided with sight gage tubes 19 and 20 for this purpose. It will be understood from this description that the spaces above the oil levels within the equalizing chambers 10 and 13 as well as in the columns 9 and 12, are filled with residual bodies of supercooled condensed refrigerant thru which the differential pressures are transmitted to the oil and mercury columns. It will be understood therefore that by knowing the density of the mercury, oil and refrigerant as well as the differential pressures transmitted thereto by means of the residual bodies of the volatile fluid, it is a simple matter to calculate the flow of refrigerant thru the meter according to well known laws. In order to render this process of metering effective under certain unfavorable conditions of temperature to which the meter is sometimes exposed suitable and efficient means are provided for preventing volatilization in the residual portions of the volatile fluid. For this purpose, those portions of the meter which contain said residual portions, are provided with cooling means which in the present embodiment of my invention comprises an outer shell 21 surrounding the vertical columns 9 and 12 and equalizing chambers 10 and 13. The portions of said jacket which surround said equalizing chambers are connected by a tubular passage 22. With this arrangement an inlet opening 23 for the cooling medium, may be provided in the upper end of the outer shell surrounding the column 12 and a discharge outlet 24 in the upper end of the shell around column 9. The cooling water will thus pass downwardly around the equalizing chamber 13 thru the passage 22 and upwardly around the equalizing chamber 10 and out of discharge passage 24. In the modification shown in Figure 2, the section 25 of the pipe or conveyer is jointed to an adjacent section 26 thereof, a partition 27 provided with an orifice 28 being interposed between said sections for the purpose of producing a differential pressure between the vertical columns 29 and 30 which lead to equalizing chambers (not shown) corresponding to those shown in Figure 1. A jacket 31 for a cooling medium is arranged around these columns and equalizing chambers.

In the embodiment of my invention shown in Figure 3, my invention is shown in connection with the usual form of Venturi tube, the application of such a tube to a refrigerating system, being shown and described in my above identified Patent No. 1,471,732. According to this embodiment, the cooling medium enters thru an inlet 32, into an annular chamber 33 surrounding the throat 34, passing downwardly thru the annular chambers 35 and around the equalizing chambers 36 and thru the tubular passage 37, and thence upwardly around the equalizing chamber 38, thru the annular chamber 39 surrounding the piezometer ring 40 and out of the discharge outlet 41. A general diagram of the arrangement of this venturi meter in a refrigerating system, is shown in Figure 4, according to which one end of the Venturi tube is connected to a supercooling or heat interchanging chamber 42, while the other end thereof is connected to a pipe leading to an evaporator (not shown). According to my above identified patent, a fluid intercooling chamber is arranged between the venturi meter and said evaporator.

I claim:

1. The combination with a head meter provided with restricted and unrestricted sections, of means for supercooling a volatile fluid before passing thru said meter, means for measuring differential pressures existing between said restricted and unrestricted sections, portions of said measuring means being accessible to said supercooled volatile fluid, and means for cooling said portions of the measuring means for preventing vaporization of the volatile fluid therein.

2. The combination with means for measuring the differential pressures of a differential pressure meter, said measuring means having a space for accommodating a residual portion of a condensed volatile fluid to be metered by said meter, and means for maintaining the walls of said measuring means contiguous to the space occupied by the residual body of said volatile fluid at a temperature not exceeding the critical temperature of boiling of said fluid under the least pressure to which it is subjected in passing thru said meter.

3. Metering apparatus for condensed volatile refrigerant, said apparatus comprising a meter tube having portions in which said volatile fluid is subjected to different pressures, and means for cooling portions of said metering apparatus for maintaining a temperature lower than the critical temperature of boiling corresponding to the lowest pressure prevailing in any portion of said apparatus.

4. The combination with means for supercooling a compressed and condensed volatile refrigerant of a head meter connected thereto, said meter being provided with means for maintaining said refrigerant at a temperature below the critical temperature of boiling corresponding to the lowest pressure attained by said refrigerant during its passage thru the meter.

5. The combination with means for supercooling a compressed and condensed volatile refrigerant, of a head meter connected thereto, said meter being provided with means for supplying a cooling medium to the walls thereof to prevent the vaporization of said refrigerant in said meter.

6. The combination with a conveyer for compressed and condensed volatile refrigerant, of means for supercooling said refrigerant as it passes thru said conveyer, and a head meter connected to said conveyer, said meter being provided with a cooling medium jacket for preventing any vaporization of the volatile fluid within said meter.

GEORGE A. HORNE.